Dec. 21, 1943.  A. AMES, JR  2,337,363
STEREOSCOPIC REPRESENTATION
Filed Dec. 24, 1940  5 Sheets-Sheet 4
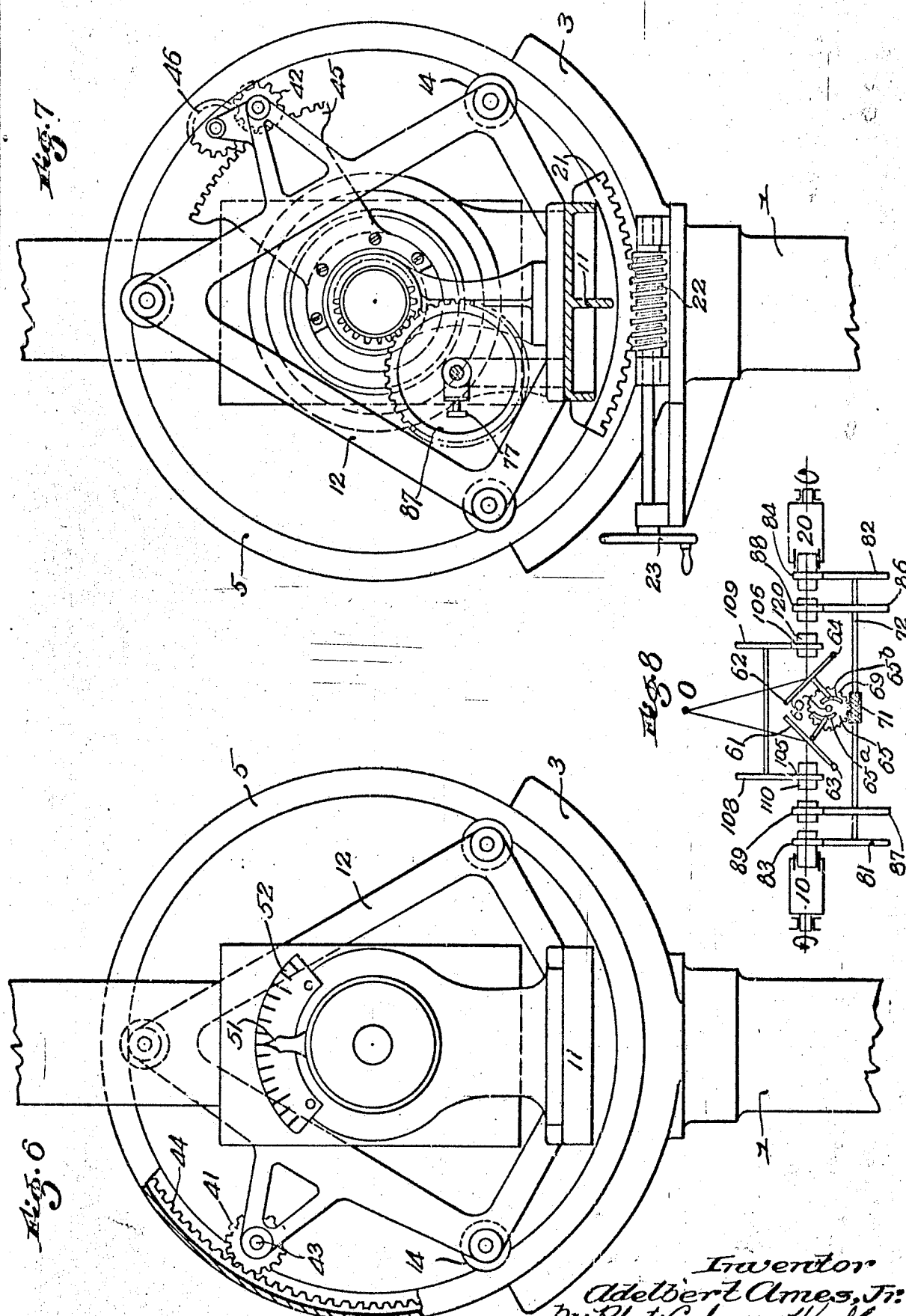
Inventor
Adelbert Ames, Jr.
by Roberts, Cushman & Woodberry
his attorneys Inventor:
Adelbert Ames, Jr.
By Roberts, Cushman & Woodberry
his Attys.

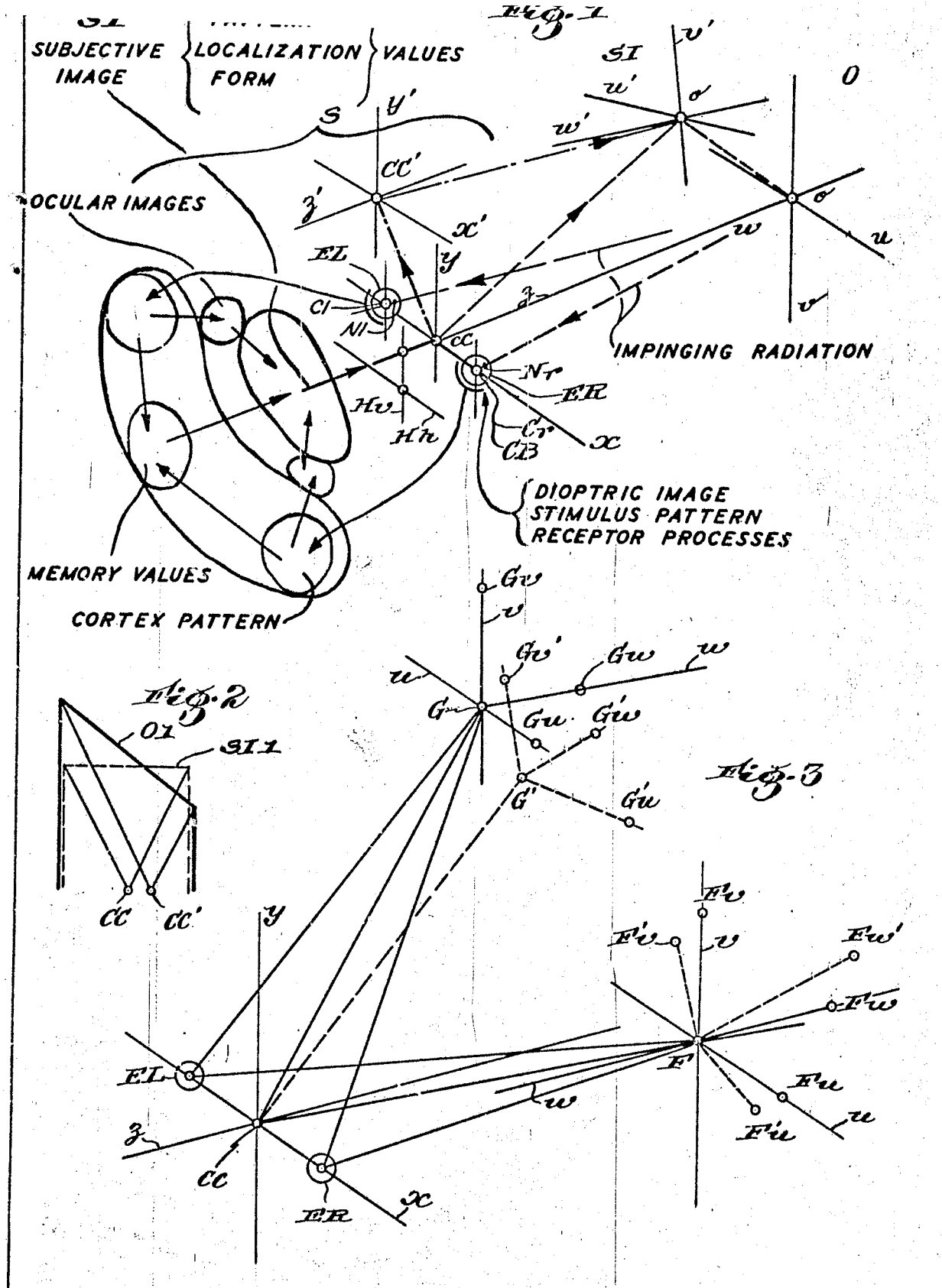

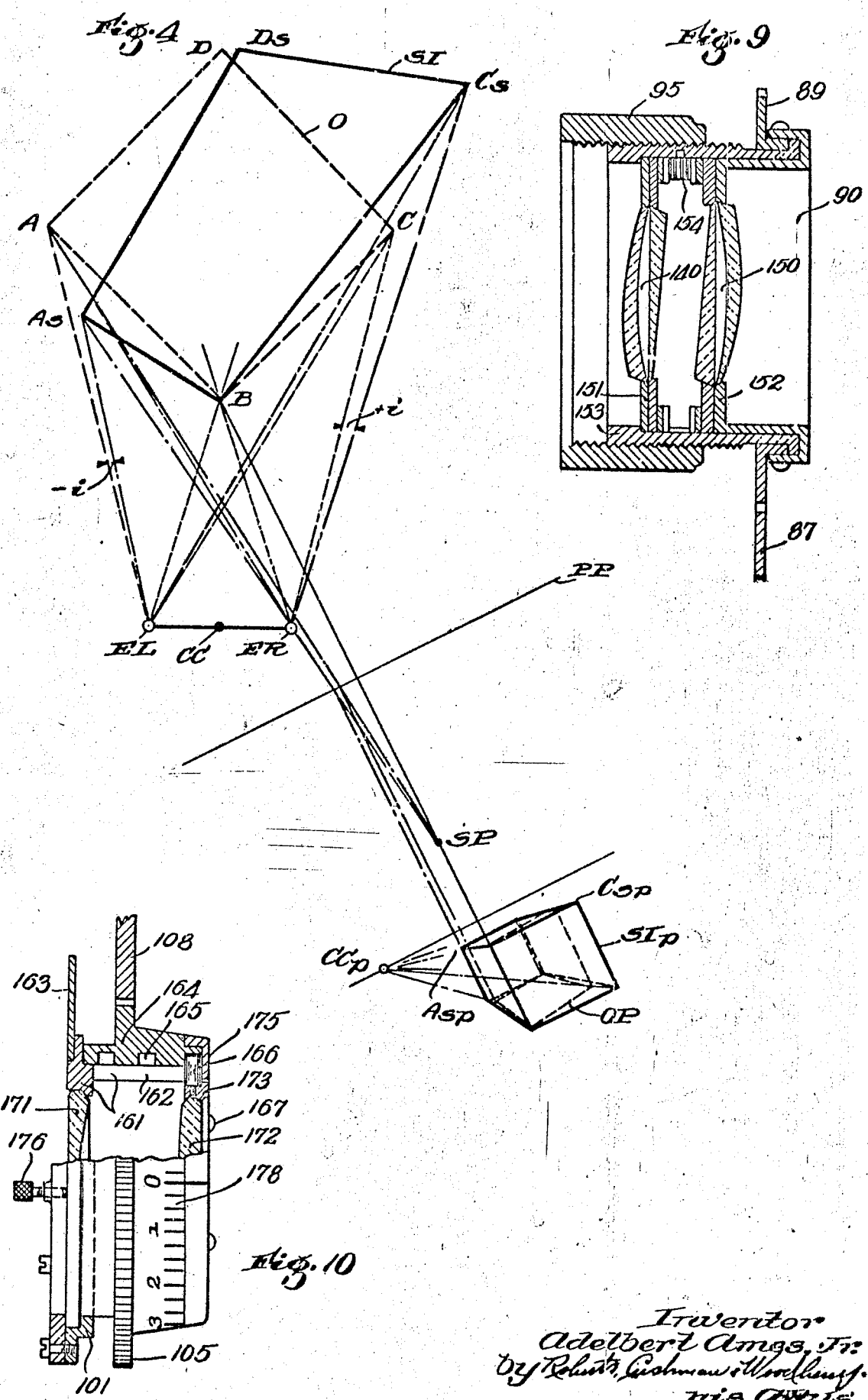

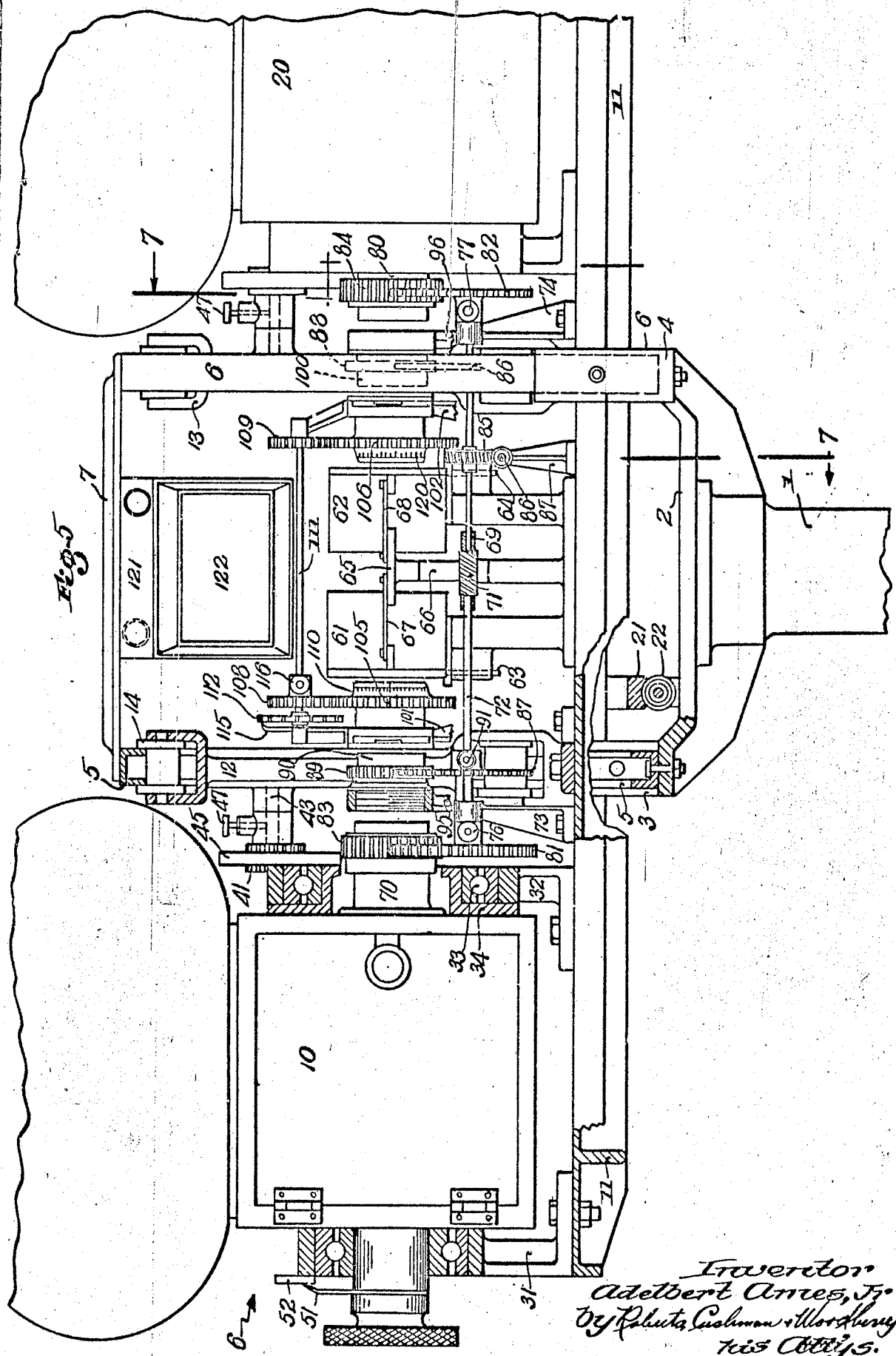

Patented Dec. 21, 1943

2,337,363

UNITED STATES PATENT OFFICE 2,337,363

STEREOSCOPIC REPRESENTATION

Adelbert Ames, Jr., Hanover, N. H.

Application December 24, 1940, Serial No. 371,512

6 Claims. (Cl. 88—16.6)

This invention deals with a method, and means for carrying out that method, of presenting to the viewer object fields representative of the various visual arts in a manner providing these arts with new means of expression, thereby freeing them from conventional notions which disregard certain physiological and aesthetic facts.

The conventional works of art are representations of object fields including more or less of the artist's imagination, and produced according to principles which are not based on the actual and complete physiological function of "seeing" but on arbitrary abstractions thereof, among others especially the laws of central projection (perspective) derived from an unduly simplified conception of monocular vision, and the stereoscopical laws derived from a likewise over-simplified conception of the function of binocular vision.

I have found that it is quite feasible to broaden the means of representation or expression of the visual arts by utilizing certain physiological phenomena which, although not as obviously apparent as the above-mentioned principles of monocular and binocular vision, nevertheless have a very important role in the visual processes and therefore also in the visual arts.

I realize of course that artists have always tried to break away from mathematically exact perspective and unimaginative copying of three-dimensional forms; however, these attempts have always been made by way of pure intuition without regard to physiological facts. Therefore, these attempts can be no more than partially successful by mere chance; they are in most instances unsatisfactory and at best leave the observer with the feeling of witnessing a groping hunt after some effect of which the artist may have a more or less vague conception but which he does not really know how to express. I have no desire to claim as my invention the artistic applications generally of physiological phenomena, but I wish to protect by Letters Patent the application to the visual arts of certain definite ways and means, discovered and first practically applied by me, of controlling phenomena of vision beyond the conventional laws of perspective and stereoscopical disparity.

It is therefore the main object of my invention to adopt into the visual arts, according to definite methods of application, stimuli selected as to predetermined degrees and kinds of effects, from the complete array of physiological and optical phenomena of vision, for the purpose of widening the modes of expression and the symbolism of these arts and leading them towards more complete conformity to universal experience.

Further objects of the invention are to provide in the sphere of creative art object fields which provide the observer, to a controlled degree, with pattern, form and localization values of the subjective image of types which are actually stimulated when looking at natural objects but which it was previously impossible to utilize for this purpose; to control at will artistic object fields by introducing static or simultaneous image disparities or dynamic or consecutive image or image disparity alterations which convey apparent changes of localization of the observer relatively to the object field or a portion thereof, or vice versa, with or without associated apparent change of form, or which cause certain emotional reactions; or to control such object fields by artificially introducing form and localization values that are associated with particular localization changes of the observer relatively to the object field; and to provide two or three-dimensional representations of a more or less artistic nature (including stereoscopic still or motion pictures) which induce simultaneous image disparities or consecutive image alterations correlated to certain physiological functions as eye movements or functional changes in any element of the apparatus of vision from the pupil to the higher brain centers. A still further important object is to provide a method for depicting in two-dimensional representation controlled changes of the subjective image of an observer, and for constructing three-dimensional object fields inducing certain artistic visual effects, and to provide apparatus for cinematographically producing pictorial representations of the above type, such means including optical systems for introducing pattern disparities corresponding to certain physiological functions.

These methods of providing and presenting objects of art, and the means for carrying them into effect, may be grouped as to various functional aspects.

In one aspect, the invention deals with the qualitative and quantitative control of simultaneous image disparity and consecutive image alteration, for example, by way of suitably controlling the corresponding projected images, and the progressive alterations of each image, in systems of stereocinematography. In another aspect, the invention contemplates the controlled use in the visual arts of representations reproducing physiological phenomena accompanying, and differentiating between vision while the eye or eyes, respectively, is or are at rest or moving, respectively. In a further aspect, the invention is concerned with the relative shift of observer's station point and object or object element, respectively, with either the observer or the station point or both moving, a phenomenon which permits the introduction of a dynamic relation between art object and observer, and is possible only under strictly predetermined conditions and rules which will be in detail explained hereinafter.

Representation according to the present invention can be applied to the visual arts in the strict sense of the word, but also to other fields of visual representation which might not be considered to be covered by the strictly aesthetical meaning of the term "art"—as demonstrations of space perception, advertisements, and others.

These and other objects and aspects of the invention will be apparent from the following description of several practical embodiments thereof by way of illustrating its genus. This description refers to drawings, in which Fig. 1 is a diagrammatical illustration of some of the phenomena of visual space perception on which the invention is based, and this diagram also summarizes and correlates certain terms and concepts herein employed;

Fig. 2 is a diagram in explanation of the relative shift between station point and object;

Fig. 3 is a diagram in explanation of disparity changes with varying directions of gaze;

Figs. 4 and 11 are diagrams explaining the representation of object fields according to the invention;

Fig. 5 is an elevation, partly in axial vertical section, of a camera according to the invention;

Fig. 6 is a side view from the left-hand side of Fig. 5;

Fig. 7 is a section on lines 7—7 of Fig. 5;

Fig. 8 is a diagrammatic plan view of the camera according to Fig. 5;

Fig. 9 is an axial section through an asymmetry lens of the camera;

Fig. 10 is a side view, partly in axial section, of a size lens of the camera;

Figure 11:
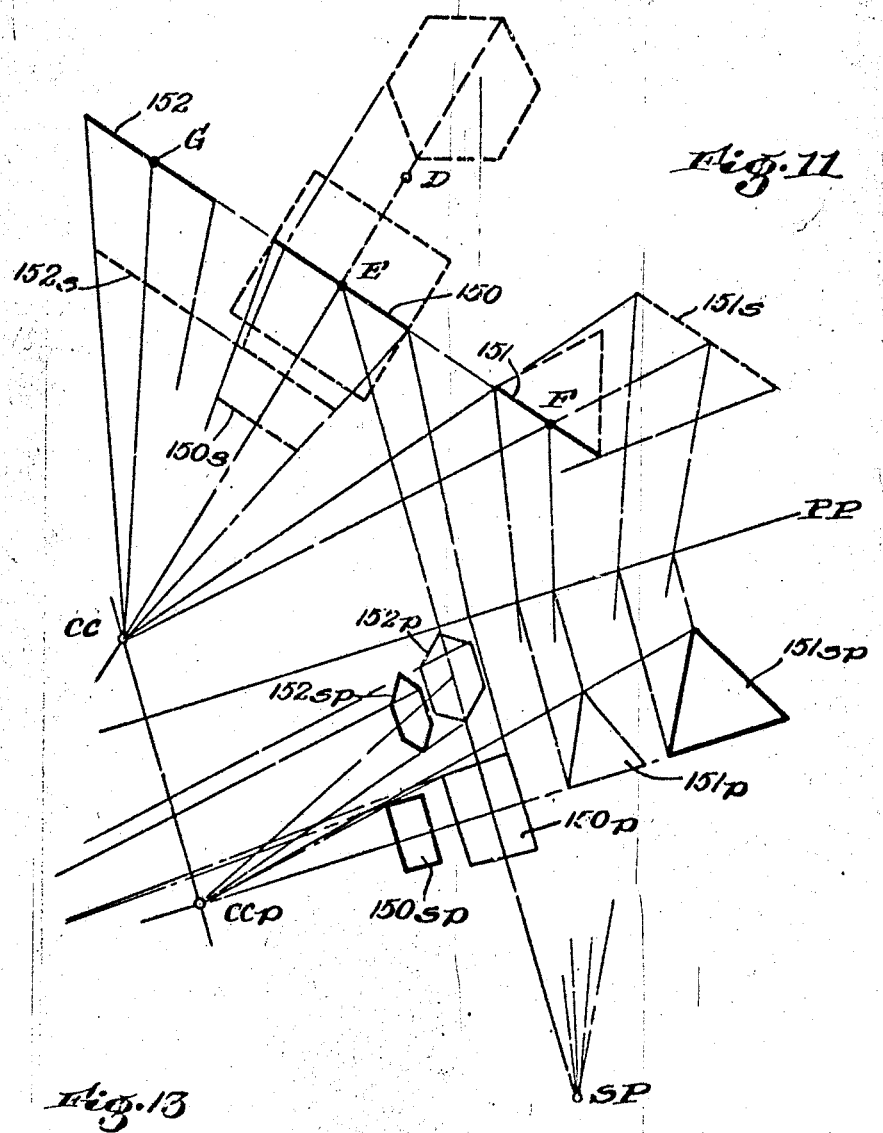

The present invention is based on new observations and discoveries concerning the factors that determine the visual perception of our three-dimensional spatial environment, more particularly facts, previously unobserved or misinterpreted, concerning the nature and relationship of the factors that effect spatial localization and form values in both monocular and binocular vision. Many of these theoretical considerations are set forth in my copending application Serial No. 334,511, filed May 11, 1940, and therefore will be only briefly outlined herein for the purpose of recapitulating the concepts and the terminology of this theory which, however, is herein supplemented in several instances for specific purposes of the present invention.

*Object field and subjective image.*—Referring to Fig. 1, an observer S may be represented by a system of axes $x, y, z$, defined by his eyes ER and EL. An object field O observed by that person may be represented by its axes $u, v, w$ (identical with $z$), axes $x, y, z$ being herein used as axes of reference although of course any other system, as for example the object field system $u, v, w$ might be selected for that purpose. Any spatial characteristic of the object field as well as any discrepancy between object field and subjective image can be expressed in coordinates of the system $x, y, z$.

As indicated in Fig. 1, the observer's eyes ER and EL receive dioptric images which provide a stimulus proper for the receptor processes which in their turn cause formation of a cortex image for each eye. The cortex images evoke cognizance of the memory values of past experience, with which they form ocular images which as a rule will have some disparity. The ocular images will contain directional or pattern values, localization values and form values (whose significance will be discussed more in detail below); from these ocular images is projected out, so to speak, a picture characterized (apart from color) by conformity to directional pattern values, by localization values and by form values, as subjective image of the object field.

The subjective image or apparent object field does not necessarily and in fact in most instances will not coincide with the actual object field, but may have an apparent localization and form such as indicated in Fig. 1 at SI, which may be derived from system $x, y, z$ by three linear and three rotatory transformation movements, in well known manner. As indicated in Fig. 1 at $x', y', z'$, the subjective image SI, as to localization values of its elements as well as to their form values, may differ from the object field O in any manner conforming to any combination of these transformation movements.

The observer's eyes ER and EL have nodal points Nr and Nl and centers of rotation Cr and Cl, the right eye center Cr being in most instances also the station point CB for near vision. The cyclopean center CC is the station point for far vision. The head turns on vertical axis Hv and horizontal axis Hh. The apparent displacement of the subjective image SI relatively to the object O, may express itself in an apparent shift of the observer S himself relatively to the object field or vice versa, and this is in Fig. 1 indicated at CC' which signifies a shifted station point for far vision.

*Values of the subjective image.*—The above introduced differentiation between "pattern," "localization" and "form" values is quite important; in any object field, or in a group of objects or object elements within the field, the effects of "pattern," "localization" and "form," respectively, are quite different, although closely interrelated.

The "pattern" values correspond to the central projection of the object field on a surface. These pattern values are exclusively directional and hence only one pattern can exist for a given object, whereas any number of objects may satisfy a given pattern. For example, a rectangular piece of board inclined to the frontal plane can induce only one pattern value "trapezoid," whereas an infinite selection of rectangular or trapezoidal boards can be held so as to induce that "trapezoid" pattern value.

The "localization" values comprise all characteristics that tell us where a thing is as to distance, direction and position.

The "form" values comprise all characteristics that tell us what a thing is; they are largely dependent on memory and localization values, and are not necessarily controlled by the central projection as dioptric image of the thing in question, that is, its pattern or directional value or conventional perspective. In the above example the concept "rectangle" connected with a thing which we know to be of rectangular form, for example a book, would be the form value.

In monocular vision, the pattern values correspond to the conventional geometrical "perspective," apart from certain physiological phenomena which will be separately discussed.

The localization values are, as far as direction is concerned, primarily derived from the pattern values, and otherwise from overlap, relative size, color and other clues of similarly rather indefinite nature. The monocular localization values are of little weight and are largely determined by the pattern and form values.

The form values depend largely on memory values but may vary with changes in directional and distance (localization) values.

Generally speaking, a monocular subjective image is linked to the objective field mainly by form values, which again are practically identical with the cortex pattern; the localization depends mainly on the form and hence on the pattern so far as the latter incorporates the laws of central projection or geometric perspective.

In binocular vision, the pattern values represent the common denominator of the two monocular ("perspective") patterns, for purposes of determining subjective image form. Changes in disparity of the ocular images will not affect the pattern value which is a unitary concept and not dependent upon any such image difference.

The localization values comprising distance, directional and positional clues are, in binocular vision, unequivocally derived from the disparity of the two ocular images, provided that more than four distinct points or elements are contributing to the object element in question. However, it is very important to note, for purposes of the present invention, that, as far as these localization values—derived from disparity—are concerned, the subjective image will coincide with the object field only if the image disparity conforms strictly to geometric stereoscopy; any deviation therefrom causes the subjective image which is projected out to differ from the impinging radiation coming from the object field.

The form values in their turn depend on memory, pattern and localization values, but, since the binocular localization values based on image disparity have more weight than the monocular localization values, the form values are more definitely tied to the localization values.

The difference between subjective image and objective field involves form as well as localization values; the subjective localization as affected by image disparity may become apparent either as a shift of the subjective image relatively to the observer, or as an apparent shift of the latter's station point relatively to the object, depending on various factors, mainly the pattern values.

Referring to Fig. 2, it will be evident, especially with reference to my above-mentioned copending application, that an observer will perceive an object field O*l* as subjective image S*ll* as if he were located at CC' instead of CC, if the image disparity has been affected to induce this relative localization, but the object field is of such nature that the pattern values are not appreciably changed, that is, the angles subtended from the object field and the subjective image, at CC and CC', respectively, are substantially the same.

Summing up a few of the most conspicuous phenomena concerning the relation of observer, object field and subjective image, and again having reference to my above-mentioned copending application, it may be said that objects may apparently be displaced parallel to themselves (as for example the sea, whose memory values strictly prevent any tilting), or tipped without being displaced (as a lawn on which the observer stands), or neither displaced nor tipped, but seen in another form (as an object element within an environment with few pattern values).

In this connection it should also be noted that, for far vision, the station point is represented by the cyclopean eye (CC in Fig. 1), whereas for near vision, the station point shifts to the dominant eye, usually the right eye (CB in Fig. 1). Hence, station point and object field are correlated not only through image disparity proper but also through this transposition of the station point upon convergence changes between far and near vision. This phenomenon can be reproduced for purposes of the invention by passing from symmetric disparity changes for far vision, to asymmetric changes (faster for the dominant eye) for near vision.

*Art and subjective image.*—If it is assumed that we project our spatial values out along the same directions as the impinging radiations are coming in, then our subjective visual impression conforms to the objective reality so that in pictorial representation, there is no way to tell whether the objective reality or the subjective image is represented. If, however, cognizance is taken of the fact that in normal binocular vision, due to anatomical, physiological and psychological phenomena we project out our spatial values in directions other than the direction of the impinging radiations, excepting perhaps a comparatively very small field at a distance of about twenty feet at an angle of 10° downwardly, then it becomes possible to depict a subjective image which in certain characteristic ways differs from a real object. Geometrical perspective as well as geometrical stereoscopy assume the same incoming and outgoing directional values; according to the present invention, deviations from these conventional phenomena are introduced which are necessary for absolute localization—and actually take place during such continuously occurring functions as looking with both eyes from near to far, or from right to left, or up and down.

Referring more particularly to the above discussions of monocular vision, it is true that the therein referred to limitations based on the nature of the single cortex pattern are strictly correct only if the observer had never had the use of more than one eye, because monocular vision is conditioned to perceive forms through the influence of memory values based on binocular vision; nevertheless, it can be correctly said that a work of art based only on the primary premises of monocular vision, that is, on conventional perspective, incorporates the above limitations of monocular vision. Hence, the visual arts could provide only an abstract and static answer to the problem propounded; in its very nature this answer is not in conformity with normal experience. Any attempts to broaden this rather poor language of art beyond that phase of monocular vision which is characterized by the geometric perspective of the stimulus pattern have been haphazard since not based on knowledge or proper interpretation of the physiological principles of vision in all its ramifications.

Therefore, art forms based on phenomena of vision which go beyond geometrical perspective and stereoscopy will offer an infinite number of answers to the problem of how to present a particular object; those answers can be selected which are in conformity with the experience of image disparity or alteration under certain physiologically and psychologically meaningful conditions. This is a good art language, it is equivocal and offers infinite possibilities, universally understood.

Artistic representations based on conventional geometrical perspective and stereoscopy are abstractions neglecting disparities and alterations superimposed thereon which are just as important as these abstractions themselves; the latter may represent an average of all the continuously occurring changes of the incoming receptor process stimulations, but they obliterate like any statistical mean value, the nuances and shadings which are the essence of life.

On the one hand, any simulation of the visual experience of naturalistic environment will gain in trueness to experience if the subjective image is induced by selectively utilizing all kinds of ocular image disparities and alterations, in accordance with the artistic purpose at hand, with or without the geometrical disparities, for example, recorded on conventional stereo motion picture film. In this instance, it is possible to convey to the viewer of a stereo motion picture film the physiological phenomena actually accompanying for example a fatigue sensation by introducing pattern disparities due to accommodation reactions of fatigue—or the scanning of a high tower or mountain can be made more convincing by incorporating pattern disparity due to upward rotation of the eyes relatively to the head—or the observer's station point can be apparently moved or rendered indefinite.

On the other hand, effects not directly predicated on simulation of such pattern, localization and form value changes which the individual accepts as normal experience, offer to the artist an opportunity to introduce a new element of expression reaching beyond the mere reproduction or imitation of human experiences.

Three especially important ways are available for conveying these novel aesthetic experiences, namely, control of ocular image disparity in representing double image or stereoscopic still or moving pictures; or three-dimensional objective fields, as models or sculptures; or two-dimensional objective fields, as single image still or moving pictures.

Before describing these, some of the physiological image disparities and alterations (apart from geometrical perspective and stereoscopy and hence herein referred to as para stereoscopic) will be discussed which the present invention makes available for artistic purposes.

*Para stereoscopic image incongruities.*—Referring now to Fig. 3, the nature and effect of some of the most important para stereoscopic disparities will be discussed, it being understood that this discussion is not exhaustive and given merely by way of example.

In Fig. 3, EL and ER are again the left and right eyes, respectively, looking downwardly at an angle of about 10° at a point F about twenty feet from the eyes. There is around point F a comparatively small area for which cyclo, asymmetrical, and size disparities are practically absent, and the corresponding relation of foveal cortex patterns will indicate the direction of gaze accordingly. With the eyes converging at F, the environments of points Fu, Fv and Fw of the field around F, imaged at peripheral retinal areas, will have different disparities from those of point F; object elements around Fu will have a certain horizontal size disparity, those around Fv a certain cyclo disparity, and those around Fw a certain asymmetric disparity. The entire field will have disparity characteristics typical of this particular direction of gaze (that is, the position of the eyes relatively to the head) and the localization and form of the various object elements in the field of vision. The subjective image therefore can be indicated by F'u, F'v and F'w, these positions being arbitrarily chosen for the purpose of qualitative explanation only.

If the eyes are now rotated to look at point G upward, to the side and nearer than F, the foveal disparity will have certain cyclo, asymmetric and size component characteristics indicative of this particular localization of the object which is fixated; points G, Gu, Gv and Gw will have their own specific disparity characteristics inducing a subjective image G', G'u, G'v, G'w. Assuming that F, Fu, Fv and Fw are in the object field arranged similarly to G, Gu, Gv, Gw, respectively, the disparity differences between F and Fu, Fv and Fw will be unlike those between G and Gu, Gv and Gw, respectively, and hence the subjective images will be different. These conditions are part of the normal visual space perception processes; it will now be evident that image discrepancies other than geometrical stereoscopy constitute an extremely important phase of these processes, especially in view of the fact that the physiological happenings underlying these phenomena are to a good deal also psychologically conditioned. Hence, it will be seen that control of image discrepancy for artistic purposes will have to take into consideration especially these three para stereoscopical disparities.

From the above it will be evident that the image disparities effected by a particular direction of gaze are subjectively conditioned by the relative position of the receptor elements (including rods and cones of the retinas) corresponding to the position of the fixation object relatively to the head, and that superimposed upon these subjective discrepancies are the objectively determined image disparities originating in the dioptric images. It will be further noted that necessarily both subjective and objective disparities are of the same degree of accuracy; hence any discrepancy change indicative of direction of gaze, if of similar magnitude to disparity changes above the threshold value corresponding to recognized external changes, is also subjectively recognized.

Since the above-mentioned three types of para stereoscopic disparity are especially significant as means of artistic expression, their nature will be shortly discussed.

Cyclo disparity exists if the two ocular images of a given meridian of the object field are relatively inclined. The ocular images of a line in the median plane and normal to the direction of gaze will not have cyclo disparity; rotation of such a line within the median plane to bring the upper end nearer to the eyes results in excyclo disparity (the upper ends of the image meridians tipped nasalward); rotation to bring the lower end nearer to the eye results in incyclo disparity (the upper ends of the image meridians tipped templeward). For example, increasing the cyclo disparity of the ocular images of the above-mentioned line may be interpreted either as a moving closer to the eye of the line in the object field, or as a tilting down of its near end. Analogous rules prescribe the relations between any object field element and the observer as affected by cyclo disparity.

Asymmetric disparity is due to the fact that the nasalward half of the visual angle of a horizontal object increases relatively to the templeward angle, as the object comes nearer, and vice versa if the object moves away. If the nasalward angle is artificially increased, the object will subjectively appear nearer and, because the pattern remains the same, smaller, and vice versa.

Size disparity, especially represented by horizontal meridional disparity, is due to the fact that the ocular image of a horizontal line normal to the direction of gaze increases for the left eye, for example, relatively to the image of the right eye, if the line moves laterally toward the left, and vice versa. An artificial increase of this disparity may be interpreted as tipping, sidewise displacement, or asymmetrical in and out displacement.

It should be understood that the above are merely examples, although of the most important, but nevertheless not the only para stereoscopic disparities; they will be used in various combinations and degrees of weight of one or the other type, according to the intended artistic purposes. Of other types of disparities only one other type will be referred to herein by way of example, namely those which relate to the distinction between head, eye and object movements.

*Eye and head movements.*—It is a fact that the environment appears to stand still if head or eyes are moved, although it appears to move upon movement of the observer relatively to the object, in spite of the fact that the movement of the dioptric images over the retinas is theoretically the same in both instances.

Considering the problem first from the monocular aspect, the directional pattern values of (1) the moving eye are affected (assuming that the observer has been conditioned through binocular vision) by cyclo, asymmetric and size shifts between the receptors and the dioptric images. With the eye looking straight ahead, a certain relation between receptor elements and dioptric image patterns exists; if the eye turns towards one side, changes characteristic of that relation take place. Further, there will be a parallax due to the fact that the center of rotation does not coincide with the nodal point of the eye. If (2) the head moves, the above changes will take place in quite a different manner and the parallax due to turning around axis Hv or Hh (Fig. 1) will be quite different from that due to turning about Cr. Also, the proprioceptor effects of eye and neck muscles come into play and the balance apparatus (semicircular canals) indicates whether or not the head moves. If (3) the object moves, the above pattern changes occur in an again different manner, whereas parallax and proprioceptor effects are absent. All these differences convey differentiation between eye, head and object movement.

In binocular vision, all above effects are present, and in addition the following ones: In primary position there exists a certain systematic image disparity, if (1) the eyes move up or down or converge towards farther or nearer objects, the cyclo and asymmetric disparities will change accordingly, as above described with reference to Fig. 3. If (2) the head moves, or (3) the object moves, the above disparity changes take place in quite different manner, indicating the nature of the particular movement of the dioptric image relatively to the receptor pattern.

The above subconscious differentiation between eye, head and object movement accounts for the fact that, for example, a room which is presented to an observer with an artificially introduced disparity and hence discrepancy between projected out subjective image and incoming radiation, appears with the same distortion regardless of the head and eye position relatively to the room, in which connection it will be noted that there are four possible combinations of eye and head positions relatively to the object, with eyes or head in primary or turned position. This is because the head and eye position is subconsciously taken into account by way of the above differentiating factors and so to speak subtracted from the general stereoscopical and para stereoscopical disparities and alterations, so that we become actually conscious of our position in space regardless of the eye and head position. All these phenomena can be utilized according to the invention, by introducing appropriate disparities and alterations superimposed on the geometrical stereoscopic disparities; in this manner, sensations based on eye and head positions of the observer can be induced.

*Practical embodiments.*—With the above theoretical and general considerations in mind, it will be possible to understand an explanation of several practical embodiments relating to the above-mentioned three principal types of the visual arts to which the invention can be applied, namely, stereoscopic still or motion pictures; three-dimensional fields, as models and sculptures; and two-dimensional fields, including single image still or moving pictures. It will be explained how an object field can be depicted in these various ways in accordance with the invention; for the sake of simplicity, a very simple object, namely a cube, has been chosen, but it is of course understood that the principles of the invention are applicable to any object field or portion of an object field.

In Fig. 4, EL and ER represent the eyes of an observer with cyclopean center CC, assumed to view a cube O indicated by its plan view ABCD. If this observer has perfect vision and the object were in the above-mentioned zone which is substantially free from para stereoscopic disparities, the subjective image would also be ABCD. If, however, a para stereoscopic factor is present, for example, if the right eye sees with a wider horizontal angle of vision as compared to the angle subtended by the same object element at the left eye, the subjective image SI will comprise points $A_s$, $B_s$, $C_s$ and $D_s$. In Fig. 4, the horizontal ocular image size change is indicated at $+i$ and $-i$ for the right and left eye, respectively. The subjective image points are obtained by intersecting the modified rays corresponding to the various points, from the respective eyes, as for example indicated for points $A_s$ and $C_s$.

The subjective image cannot be represented in a two-dimensional perspective with the observer's cyclopean center CC as station point, because the form or directional values have not changed; therefore, in accordance with one phase of the invention, a new station point SP corresponding to the position of a viewer looking at a picture plan PP are selected and a para stereoscopic perspective of the cube comprising points $A_s$, $B_s$, Cs, Ds constructed by retaining the pattern values, that is, by keeping corresponding points of a conventional perspective of the undistorted object OP, and of the para stereoscopic perspective SIp on rays intersecting at CCp, which is the perspective of observer CC.

The para stereoscopic perspective SIp of the subjective image includes for example points Asp and Csp; for purposes of comparison, the conventional perspective of the cube as it could be seen with only conventional or mathematical stereoscopy present, is indicated at Op in dotted lines.

The various possibilities of applying the invention can now be explained with reference to Fig. 4 as follows:

*Stereoscopic representation.*—Photographic records can be taken stereoscopically of object field O, for example, by means of two cameras with the nodal points of their lens systems at points corresponding to EL and ER of Fig. 4. By viewing these pictures through appropriate apparatus, a stereoscopic view of field O will be observed, this view being unaffected by the above-discussed para stereoscopic phenomena, and therefore limited in this respect regardless of the artistic merits it might otherwise have. In accordance with the principles of the present invention, the stereoscopic pictures presented to the observer must furnish a subjective image SI; this purpose could be obtained, at least theoretically, by distorting object O into shape SI and photographing it then with a conventional stereo camera. Another possibility would be to furnish the onlooker with optical means effecting the desired para stereoscopic changes. For obvious reasons, these methods are hardly practical and I therefore propose to photograph object field O by means of a stereo camera able to affect the individual records in such a manner that they will induce ocular images resulting in the desired subjective image SI. Such a camera will now be described.

Referring to Figs. 5, 6 and 7, a base 1 of suitable construction supports a platform 2 with two circularly curved brackets 3 and 4. Screwed to brackets 3 and 4 are two ring tracks 5 and 6, respectively, preferably rolled and welded steel channels connected at their upper periphery by a bridge 7. Within these annular tracks rotates a bed plate 11 suspended by means of two roller frames 12, 13 screwed thereto, each frame having three flanged wheels indicated at 14 and running on the inside of tracks 5 and 6. Fastened to bed plate 11 is a toothed sector 21 meshing with worm 22 journaled on platform 2 (Figs. 5 and 7). By means of a hand wheel 23, bed plate 11 can be rotated around the axis defined by the centers of tracks 5 and 6.

The bed plate 11 carries two conventional motion picture cameras 10 and 20, whose optical axes coincide with the above axis defined by rings 5 and 6, on four bearing brackets indicated at 31, 32 for camera 10, supporting the cameras through ball bearings 33 whose inner cases are fastened to the cameras by flanges 34, as indicated for the front support of camera 10.

The roller frames carry, in addition to runners 14, gear wheels 41 and 42 on a common shaft 43 and meshing with inside toothed sectors 44 fastened to ring tracks 5 and 6 and outside toothed sectors 45 fastened to the camera, respectively. For one of the cameras, for example 20, a reversing gear is provided, for example as shown in Fig. 7, where a third wheel 46 is inserted between gear wheels 41 and 42. The gears are so dimensioned that, upon pointing up and downwardly of the cameras through rotation of bed 11 within tracks 5 and 6, the two cameras will perform coaxial rotations of equal angular deviation but opposite sense, the degree of deviation being determined by the physiological considerations relating to cyclo disparity as herein discussed. In order to permit independent rotation or fixation of the cameras, gear wheels 41 may rotate on shafts 43 to which they can be fixed by means of coupling pins 47. A suitable brake or other individual fixating means (not shown) being provided, each camera can be set in any desired position about the optical axis, which positions may be determined with the aid of indicator 51 and scale 52 (Figs. 5 and 6).

As indicated schematically in Fig. 8, the cameras are pointed at an object to be photographed by means of two reflectors 61, 62 pivoted on bed 11 at 63, 64 (Fig. 5) and controlled by a cam disk 65 and tie rods 67, 68. Cam disk 65 is pivoted at 66 and has a gear rim 69 meshing with worm 71 fastened to shaft 72 which is journaled in brackets 73, 74 fastened to bed plate 11. Fastened to shaft 72 by means of coupling pins 76, 77 (similar to 47, above) are gear wheels 81 and 82 meshing with geared focusing flanges 83, 84, respectively, of camera lens systems 70, 80, respectively. A worm wheel 85 meshing with worm 86 journaled in bracket 87 on bed plate 11 permits rotation of shaft 72, for example by means of a hand wheel (not shown) fastened to the shaft of worm 86.

Geared flanges 83, 84 of cameras 10, 20 respectively control in known manner the focal distances of camera lens systems 70, 80 respectively. In order to compensate for the rotatory movement of the camera bodies, objectives 70 and 80 may either be independently mounted on bed 11 and connected to the cameras through a telescopic light seal, or the focusing threads of the lens mounts may be of opposite sense, with the gears dimensioned accordingly.

Shaft 72 further carries, by means of coupling pins 91, gear wheels 86, 87 meshing with geared flanges 88, 89 of asymmetry lens systems 90, 100 in holders 95, 96 fastened to bed 11, which, in a manner described hereinbelow, provide a continuously adjustable asymmetric image disparity. By suitably shaping and dimensioning cam grooves or slits 65ª, 65ᵇ of cam disk 15 (Fig. 8), gear train 83—81—89—87——72—71—69—85— 86——86—88—82—84 the camera can be focused sharply at a point O towards which the optical axes of the camera are converged by means of reflectors 61, 62 while asymmetry systems 90, 100 provide the asymmetric distortion appropriate to the object distance in question.

Mounted on stands 101, 102 (fastened to bed 11) are two further auxiliary lenses, the size lens systems 110 and 120, respectively, which, in the manner described hereinbelow, provide a continuously adjustable image size disparity. For rotating the movable component of their systems, two gear flanges 105, 106 are provided which are coupled for rotation in opposite sense (and hence size change in opposite sense) by gear wheels 108, 109 and shaft 111; by rotating thumb wheel 112 (these parts being mounted on stands 101, 102), the size lenses can be operated to increase and decrease, respectively, for example, the horizontal dimensions of the respective images. An indicator 115 shows the amount of size change which can thus be correlated to the distance laterally of the median plane to which the horizontal size disparity is related. The two size lenses can be disconnected for individual control by means of pin coupling 116.

Bridge 7 may be used to carry a conventional range finder 121 and a view finder 122, indicated in Fig. 5.

Considering the above-outlined theory of para stereoscopical disparities, it will now be evident that a camera of the type described permits application of such disparities, selected as to kind and degree, to stereoscopic still or motion picture records.

The cyclo disparity is automatically applied by rotating the cameras in opposite sense, for excyclo and incyclo disparity, upon tilting both cameras, by means of wheel 23, on bed 11 above or below, respectively, an intermediate plane of about 10° downward inclination, for which there is substantially no cyclo disparity.

Coupled with the focusing and convergence adjustment at shaft 86, of the camera main objectives 70, 80 is the asymmetric disparity adjustment by means of lenses 90, 100 which spread the ray fans asymmetrically, proportionate to the distance of the object which is kept in sharp focus. Concerning the convergence adjustment by means of cams 65ᵃ and 65ᵇ, this can be so arranged that the cameras will in effect rotate about points outside the nodal points of the camera optics, corresponding to the centers of rotation of the eyes.

In order to apply horizontal size disparity to objects situated laterally in the field of vision, meridional size lenses 110, 120 are operated by means of thumb wheel 112, to a degree which can be regulated by means of scale 115. If desired, the meridional size adjustment can be coupled with a lateral sight automatically controlling the size lenses in accordance with the lateral displacement of objects in question.

Figure 14:
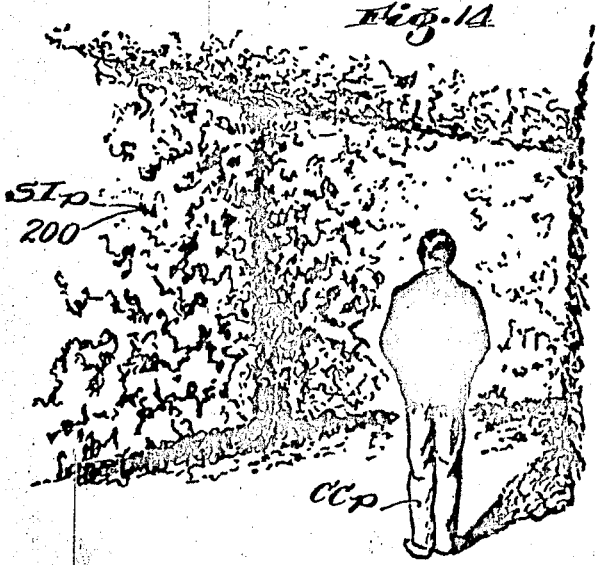
Fig. 14 is a representation according to the invention of the field and observer according to Fig. 13.

The asymmetry lenses 90, 100 may be of the type schematically indicated in Fig. 9, where 140 and 150 are two distortion prism elements, as for example described with reference to Figs. 14 and 18 of my Patent No. 2,118,132. These elements are mounted in the manner of the Risley type prisms, namely, rotatable in opposite directions by means of gear mounts 151, 152 turning within tube 153, by means of an auxiliary gear 154 rotatably mounted on stationary tube 153 fastened to stand 95 (Fig. 5). By rotating rim 89 which meshes with gear wheel 27 (Fig. 5), the asymmetric distortion can be continuously adjusted, without introducing a prismatic deflection, in a plane determined by the position of mount 153 relatively to stand 95.

The size lenses 110, 120 may be of the type described for example in Patent No. 2,107,305; instead of the rack and pinion mechanism described in that patent for changing the distance of the two lens components, a threaded mount is here used, as shown in Fig. 10. In this figure, 161 is a mounting sleeve having a slot 162 and a handle 163. On sleeve 161 rotates a second ring 164 having an inside helical groove 165 and held on ring 161 by means of an annular plate 166 fastened to ring 161 with screws 167. One lens element 171 is fixed to ring 161, and the second lens 172 to mount 173 which also carries a follower 175. Sleeve 161 is rotatably mounted in stand 181 (Fig. 5) and can be fixed relatively thereto by suitable means, for example, set screw 176. By means of handle 163 and screw 176, the meridian of the size lens systems 110 and 120 can be adjusted; by rotating ring 164 by means of gears 105 and 106 (Fig. 5), the distance of lens element 172 from element 171 can be changed, thereby adjusting the magnification according to the principle of the above-mentioned Patent No. 2,107,305. The amount of magnification change can be read from scale 178.

It will be understood that the various gears, cams, scales and other motions shown by way of example in Figs. 5, 6, 7 and 8 are not exactly to scale as to pitch, gear ratio and configuration, and that they have to be dimensioned, and if necessary varied to provide the para stereoscopic disparities in accordance with requirements based on physiological theory and experience. It will be further understood that the mechanical and optical equipment of the stereo camera may be constructed along different lines; for example, a single optical system could be provided for each camera, comprising a compound lens with elements whose distance, alignment and inclination can be changed in analogy with the optical system of the eye.

Instead of using two aligned cameras with a reflector system therebetween, two side by side cameras or a twin camera could be used, provided that they are fitted with the necessary para stereoscopic equipment.

It will now be evident that if stereoscopic pictures are taken by introducing, as above described, various types of image disparity other than, or in addition to the geometric stereo disparity, and if then these two pictures are viewed either in a stereoscope or projected, for instance, through polarized material for viewing through similar material, the viewer will experience the same subjective image that he would project out if caused to receive similar external stimulus pattern physiologically induced by looking into a given three-dimensional object field.

Hence, his subjective image will be controlled by these disparities, which control to a large degree the localization values although they are subject of course to the influence of the other above-discussed contributing factors namely, pattern (directional) and form values which are not affected by the artificially introduced para stereopsis.

*Three-dimensional representation.*—By constructing a three-dimensional work of art, as a structing a three-dimensional work at art, as a sculpture or model, to produce a subjective image inducing certain visual values as outlined above, these values can be conveyed to the viewer. Referring again to Fig. 4, a viewer at CC of an object shaped as SI will receive the same pattern (directional) and form values as if he were looking at object O, etc., but his localization values will be controlled by the configuration of SI. This type of representation is especially valuable because it offers the possibility of apparently shifting the viewer's station point relatively to the object, in the manner above explained with reference to Fig. 2.

*Two-dimensional representation.*—As already indicated with reference to Fig. 4, it is not possible to represent para stereoscopic effects from the observer's station point (CC in Fig. 4) since the pattern has not changed in the transition from O to SI; this obstacle can, however, be overcome according to the invention by selecting a second viewing point to which a perspective of SI is related, for depicting the modification of O. Such a second point is SP of Fig. 4, and perspective SIp is the two-dimensional representation of object O, representing the field of vision, as modified by para stereoscopic phenomena.

This two-dimensional representation can be applied not only to unchanging pictures, as drawings or paintings, but also to moving pictures. For example, by drawing cartoons incorporating successive para stereoscopic changes as exemplified by SIp of Fig. 4, photographing these cartoons and projecting the records in well known manner, effects similar to those described above under the heading "Stereoscopic representation" can be obtained, but in a manner independent of certain adverse conditions, as for example absence stereoscopic vision.

It will be noted that the introduction of a new station point (SP in Fig. 4) permits the showing in perspective of the subjective image (SI) of an observer from his particular position (CC) relatively to the time object (O); this manner of representation provides a reversible relationship between object field and pattern (directional) values, a relationship which could heretofore not be expressed. In this manner, pictorial art is for the first time provided with consciously and controllably applicable means for conveying to one person (the viewer SP) the impression of another person's (the observer's CC) impression; heretofore all drawings and pictures attempted only to express the impressions of a joint observer and viewer.

In order further to clarify the above explanations, the three principal para stereoscopical disparity phenomena will now be schematically applied to an object represented by a simple figure. Referring to Fig. 11, an observer, again indicated at CC, is assumed to look first at point D in primary position at a certain distance. A square 150 is placed in the direction of gaze but nearer to CC than the fixation distance. If the observer now looks from D to E at the square, the latter, due to the asymmetric disparity change, will appear nearer and smaller than before, at 150s.

For reasons given above, this change cannot be shown in a perspective with CC as station point, but a para stereoscopic perspective related to viewer SP will show the change; in Fig. 11 representations 150p and 150sp indicate this change. Similarly, a triangle 151 may be placed laterally to the right of point D at F; the observer at CC again looks first at D, and then at F. Due to the horizontal size change (increase in the right, decrease in the left eye) the triangle will now appear at 151s, farther out towards the right (it might also appear tipped), the change being indicated at 151p and 151sp, respectively. Still further, a hexagon 152 may be placed at G above initial fixation point D; if the eyes change their gaze from D to G, the hexagon will appear nearer at 152s. Again, the change is indicated in perspectives 152p and 152sp, related to a viewer's station point SP and depicted on plane PP.

Figure 13:
Fig. 13 is a plan view of the field according to Fig. 12, with an observer.
Figure 12:
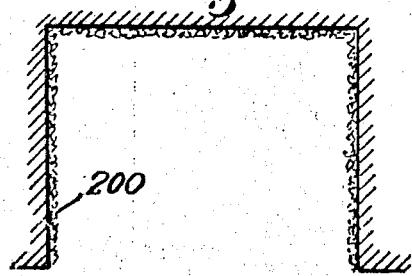
Fig. 12 is a conventional perspective of an object field.

In order to make these phenomena still clearer, a simple natural object, as a leaf bower 200 or hedge cubical, will now be treated according to the invention. The plan of such a bower is shown in Fig. 12, whereas Fig. 13 is a conventional perspective of the bower as seen by an observer at CC. If it is now desired to convey the impression corresponding for example to a horizontal size increase, of about 4%, a para stereoscopic perspective can be constructed in accordance with the principles explained with reference to Fig. 4; the result is represented in Fig. 14 which, for the sake of explanation, includes the onlooker although he need not be depicted.

It will now be apparent that the above-referred-to principal para stereoscopical disparity changes correspond to those above described with reference to Fig. 3, and that these physiological disparities can be duplicated with the aid of a stereo camera of the type above described, or by appropriately shaping three-dimensional models, or by two-dimensionally depicting the subjective image or images in question either in the form of a single picture or drawing or as a sequence of animated pictures incorporating selected changes of para stereoscopic disparity.

It should be understood that the present disclosure is for the purpose of illustration only and that this invention includes all modifications and equivalents which fall within the scope of the appended claims.

I claim:

1. Apparatus for photographically recording pairs of stereoscopically related pictures of an object field adapted to provide, when stereoscopically viewed, three dimensional subjective images controllably correlated to said object field, said apparatus comprising means for holding light sensitive material, optical means for projecting from two station points images of said object field onto said material, and means for imparting to said pictures, aside from incongruities between said pictures which may be due to said difference of station point, another selected incongruity which corresponds to a controllable amount of such difference between the right and left ocular images of a viewer as is due to physiology of the human visual apparatus other than mere separation of the eyes and which incongruity varies with direction of gaze and fixation distance, whereby said pictures, when stereoscopically viewed, produce ocular images incorporating incongruities causing said controlled correlation of subjective image and object field through said selected picture incongruity.

2. Apparatus for photographically recording pairs of stereoscopically related pictures of an object field adapted to provide, when stereoscopically viewed, three dimensional subjective images controllably correlated to said object field, said apparatus comprising means for holding light sensitive material, optical means for projecting from two station points images of said object field onto said material, and means for rotating said images relatively to each other with regard to their position on said sensitive material thereby imparting to said pictures, aside from incongruities between said pictures which may be due to said difference of station point, a rotary incongruity which corresponds to a controllable amount of rotatory difference between the right and left ocular images of a viewer as is due to physiology of the human visual apparatus other than mere separation of the eyes, whereby said pictures, when stereoscopically viewed, produce ocular images incorporating rotatory incongruities causing said controlled correlation of subjective image and object field.

3. Apparatus for photographically recording pairs of stereoscopically related pictures of an object field adapted to provide, when stereoscopically viewed, three dimensional subjective images controllably correlated to said object field, said apparatus comprising means for holding light sensitive material, optical means for projecting from two station points images of said object field onto said material, means for pointing said projecting means upwardly and downwardly, means for rotating said images relatively to each other with regard to their position on said sensitive material, and means for coupling said pointing means and said image rotating means to provide image rotation proportionate to the degree of said pointing thereby imparting to said pictures, aside from incongruities between said pictures which may be due to said difference of station point, a rotatory incongruity which corresponds to a controllable amount of rotatory difference between the right and left ocular images of a viewer as is due to physiology of the human visual apparatus other than mere separation of the eyes, whereby said pictures, when stereoscopically viewed, produce ocular images incorporating rotatory incongruities causing said controlled correlation of subjective image and object field.

4. Apparatus for photographically recording pairs of stereoscopically related pictures of an object field adapted to provide, when stereoscopically viewed, three dimensional subjective images controllably correlated to said object field, said apparatus comprising means for holding light sensitive material, lens means for projecting from two station points light beams producing images of said object field on said material, and optical means for asymmetrically distorting said light beams, thereby imparting to said pictures, aside from incongruities between said pictures which may be due to said difference of station point, an asymmetric incongruity which corresponds to a controllable amount of asymmetric difference between the right and left ocular images of a viewer as is due to physiology of the human visual apparatus other than mere separation of the eyes, whereby said pictures, when stereoscopically viewed, produce ocular images incorporating asymmetric incongruities causing said controlled correlation of subjective image and object field.

5. Apparatus for photographically recording pairs of stereoscopically related pictures of an object field adapted to provide, when stereoscopically viewed, three dimensional subjective images controllably correlated to said object field, said apparatus comprising means for holding light sensitive material, lens means for projecting from two station points images of said object field onto said material, means for adjusting the convergence of the axes of said lens means and proportionately thereto the focusing distance of said lens means, optical means for asymmetrically distorting said light beams proportionate to said adjustment, and means for coupling said adjusting means and said optical distorting means to provide asymmetric image distortion proportionate to said convergence, thereby imparting to said pictures, aside from incongruities between said pictures which may be due to said difference of station point, an asymmetric incongruity which corresponds to a controllable amount of asymmetric difference between the right and left ocular images of a viewer as is due to physiology of the human visual apparatus other than mere separation of the eyes, whereby said pictures, when stereoscopically viewed, produce ocular images incorporating asymmetric incongruities causing said controlled correlation of subjective image and object field.

6. Apparatus for photographically recording pairs of stereoscopically related pictures of an object field adapted to provide, when stereoscopically viewed, three dimensional subjective images controllably correlated to said object field, said apparatus comprising means for holding light sensitive material, lens means for projecting from two station points images of said object field onto said material, and optical means for adjusting the relative size of said images in at least one selected meridian, thereby imparting to said pictures, aside from incongruities between said pictures which may be due to said difference of station point, a size incongruity which corresponds to a controllable amount of size difference between the right and left ocular images of a viewer as is due to physiology of the human visual apparatus other than mere separation of the eyes, whereby said pictures, when stereoscopically viewed, produce ocular images incorporating size incongruities causing said controlled correlation of subjective image and object field.

ADELBERT AMES, Jr.